United States Patent
Isoard et al.

(10) Patent No.: US 11,238,199 B1
(45) Date of Patent: Feb. 1, 2022

(54) HIGH-LEVEL SYNTHESIS VECTOR LIBRARY FOR SINGLE-INSTRUCTION MULTIPLE DATA PROGRAMMING AND ELECTRONIC SYSTEM DESIGN

(71) Applicant: Xilinx, Inc., San Jose, CA (US)

(72) Inventors: Alexandre Isoard, San Jose, CA (US); Lin-Ya Yu, San Jose, CA (US); Hem C. Neema, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 17/116,720

(22) Filed: Dec. 9, 2020

(51) Int. Cl.
| G06F 30/30 | (2020.01) |
| G06F 30/327 | (2020.01) |
| G06F 30/323 | (2020.01) |
| G06F 16/22 | (2019.01) |
| G06F 111/20 | (2020.01) |

(52) U.S. Cl.
CPC ........ *G06F 30/327* (2020.01); *G06F 16/2291* (2019.01); *G06F 30/323* (2020.01); *G06F 2111/20* (2020.01)

(58) Field of Classification Search
CPC .. G06F 30/327; G06F 30/323; G06F 16/2291; G06F 2111/20
USPC ...................................................... 716/103
See application file for complete search history.

(56) References Cited

U.S. PATENT DOCUMENTS

| 7,428,718 | B1 | 9/2008 | Singh |
| 7,536,661 | B1 | 5/2009 | Singh |
| 7,574,688 | B1 | 8/2009 | Ward |
| 7,725,855 | B1 | 5/2010 | Jang |
| 7,853,914 | B1 | 12/2010 | Srinivasan |
| 8,302,041 | B1 | 10/2012 | Chan |
| 8,769,450 | B1 | 7/2014 | Tian |
| 9,081,930 | B1 | 7/2015 | Neuendorffer |
| 9,147,024 | B1 | 9/2015 | Kathail |
| 9,449,131 | B2 | 9/2016 | Han |
| 9,710,584 | B1 | 7/2017 | Hao |
| 9,824,172 | B1 | 11/2017 | Hao |
| 10,013,517 | B1 | 7/2018 | Zhou |

(Continued)

OTHER PUBLICATIONS

Xilinx, Chapter 2, High-Level Synthesis C Libraries, UG902 (v2020.1) Jun. 3, 2020, 81 pages.

(Continued)

*Primary Examiner* — Jack Chiang
*Assistant Examiner* — Brandon Bowers
(74) *Attorney, Agent, or Firm* — Kevin T. Cuenot

(57) ABSTRACT

A computer-based high-level synthesis (HLS) technique for circuit implementation includes providing a library as a data structure, wherein the library includes a function configured to perform a vector operation using one or more vector(s). The library can include a software construct defining a variable number of elements included in the vector(s). The number of elements can be determined from a variable included in an HLS application that uses the library to perform the function. The variable can specify an arbitrary positive integer value. The method also can include generating a circuit design from the HLS application. The circuit design can implement the function in hardware to perform the vector operation in one clock cycle. A data type of each element of the vector(s) may be specified as a further software construct within the library and determined from a further variable of the HLS application.

20 Claims, 8 Drawing Sheets

(56) References Cited

U.S. PATENT DOCUMENTS

| | | | |
|---|---|---|---|
| 10,031,732 B1 | 7/2018 | Li | |
| 10,108,769 B1 | 10/2018 | Li | |
| 10,303,833 B1 | 5/2019 | Gayasen | |
| 10,496,777 B1 | 12/2019 | Venkatakrishnan | |
| 10,586,005 B1 | 3/2020 | Chandrasekar | |
| 10,671,779 B1 | 6/2020 | Neuendorffer | |
| 2004/0153978 A1* | 8/2004 | Xiang | G06F 30/30 716/103 |
| 2005/0235232 A1* | 10/2005 | Papanikolaou | G06F 30/30 700/33 |
| 2020/0225947 A1* | 7/2020 | Nagi | G06F 7/5443 |
| 2021/0109809 A1* | 4/2021 | Paul | G06F 11/1068 |

OTHER PUBLICATIONS

Vitis HLS Coding Styles, https://www.xilinx.com/html_docs/xilinx2020_2/vitis_doc/vitis_hls_coding_styles.html?hl=vector, 54 pages.

\* cited by examiner

400

| Operation | Inplace | Expression | Reduction |
|---|---|---|---|
| Addition | += | + | Reduce_add |
| Subtraction | -+ | - | Non-associative |
| Multiplication | *= | * | Reduce_mult |
| Division | /+ | / | Non-associative |
| Remainder | %= | % | Non-associative |
| Bitwise AND | &= | & | Reduce_and |
| Bitwise OR | \|= | \| | Reduce_or |
| Bitwise XOR | ^= | ^ | Reduce_xor |
| Shift Left | <<= | << | Non-associative |
| Shift Right | >>= | >> | Non-associative |
| Pre-increment | ++x | none | Unitary operator |
| Pre-decrement | - -x | none | Unitary operator |
| Post-increment | x++ | none | Unitary operator |
| Post-decrement | x- - | none | Unitary operator |

| Operation | Expression |
|---|---|
| Less than | < |
| Less or equal | <= |
| Equal | == |
| Different | != |
| Greater or equal | >= |
| Greater than | > |

Provide a High-Level Synthesis (HLS) vector library as a data structure, wherein the HLS vector library is specified in a high-level programming language (HLPL) and includes a function configured to perform a vector operation using one or more vectors
602

Include within the HLS vector library, a first software construct defining a number of elements included in the one or more vectors, wherein the number of elements is variable
604

Determine the number of elements included in the one or more vectors processed by the function from a first variable included in an HLS application, wherein the HLS application uses the HLS vector library to perform the function, and wherein the first variable specifies an arbitrary positive integer value
606

Generate a circuit design from the HLS application, wherein the circuit design is configured to implement the function in hardware to perform the vector operation in one clock cycle
608

FIG. 6

HIGH-LEVEL SYNTHESIS VECTOR LIBRARY FOR SINGLE-INSTRUCTION MULTIPLE DATA PROGRAMMING AND ELECTRONIC SYSTEM DESIGN

RESERVATION OF RIGHTS IN COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure relates to high-level synthesis for realizing circuit designs in integrated circuits (ICs) and, more particularly, to high-level synthesis of circuit designs that operate on vector data for implementation within ICs.

BACKGROUND

High-level synthesis or "HLS" is an automated and computer-based design process in which a description of desired behavior of an electronic system is converted into a circuit design that is ultimately realized in physical circuitry. The description of the desired behavior is typically written as an application in a high-level programming language such as C, C++, or the like. The application may be translated into a circuit design that may be specified as a register transfer level (RTL) description. The RTL description describes a synchronous digital circuit in terms of the flow of digital signals between hardware registers and the operations performed on those signals. The circuit design may be processed through a design flow, where the design flow may perform operations such as synthesis, placement, and routing. The processed circuit design may be implemented within an integrated circuit.

SUMMARY

In one aspect, a method can include providing a High-Level Synthesis (HLS) vector library as a data structure, wherein the HLS vector library is specified in a high-level programming language (HLPL) and includes a function configured to perform a vector operation using one or more vectors. The method can include including within the HLS vector library, a first software construct that defines a number of elements included in the one or more vectors, wherein the number of elements is variable. The method can include determining, using computer hardware, the number of elements included in the one or more vectors processed by the function from a first variable included in an HLS application that uses the HLS vector library to perform the function. The first variable can specify an arbitrary positive integer value. The method also can include generating a circuit design from the HLS application, wherein the circuit design is configured to implement the function in hardware to perform the vector operation in one clock cycle.

A data type of each element of the vector(s) may be specified as a second software construct within the library and determined from a second variable of the HLS application.

In another aspect, a system includes a processor configured to initiate operations. The operations can include storing an HLS vector library as a data structure, wherein the HLS vector library is specified in an HLPL and includes a function configured to perform a vector operation using one or more vectors. The operations can include including within the HLS vector library, a first software construct that defines a number of elements included in the one or more vectors, wherein the number of elements is variable. The operations can include determining the number of elements included in the one or more vectors processed by the function from a first variable included in an HLS application that uses the HLS vector library to perform the function. The first variable can specify an arbitrary positive integer value. The operations also can include generating a circuit design from the HLS application, wherein the circuit design is configured to implement the function in hardware to perform the vector operation in one clock cycle.

A data type of each element of the vector(s) may be specified as a second software construct within the library and determined from a second variable of the HLS application.

In another aspect, a computer program product includes one or more computer readable storage media, and computer readable program instructions collectively stored on the one or more computer readable storage media. The computer readable program instructions can include an HLS vector library. The HLS vector library can be specified in an HLPL and include a function configured to perform a vector operation using one or more vectors. The function can be configured to operate on one or more vectors, wherein each vector includes a number of elements determined from a first variable configured to take on an arbitrary positive integer value. The arbitrary positive integer value can be detected from the first variable as defined in an HLS application. The function is synthesizable into a circuit design that, when implemented in circuitry, performs the vector operation in one clock cycle.

A data type of each element of the vector(s) may be specified as a second software construct within the library and determined from a second variable of the HLS application.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

FIG. 4 is a table illustrating example vector operations supported by the HLS vector library described herein.

FIG. 5 is a table illustrating further example vector operations supported by the HLS vector library described herein.

FIG. 6 illustrates an example method showing certain operative features of the computing system of FIG. 1.

DETAILED DESCRIPTION

This disclosure relates to high-level synthesis (HLS) for realizing circuit designs in integrated circuits (ICs). More particularly, this disclosure relates to HLS-based generation of circuit designs for implementation within ICs from HLS applications that include vector operations. The resulting circuit designs and circuitry implemented from such circuit designs are capable of operating on vector data. In accordance with the inventive arrangements described within this disclosure, a library supporting vector operations is provided. The library may be used by an HLS application, wherein an HLS application is an application intended to be synthesized and implemented as an electronic system, e.g., as circuitry within or as an IC.

The library provides vector processing functions in the form of synthesizable program code that supports Single-Instruction Multiple Data (SIMD) programming functionality. Using the library, a designer may create an HLS application that is configured to implement vector processing functions that can be realized in hardware. In creating the HLS application, the developer may use a completely software-centric development environment and interface. The development environment, using the library, abstracts hardware-specific features of HLS application creation from the user. The hardware-specific features, absent the library, would necessarily be included in the user's HLS application (e.g., source code) to effectuate the SIMD type of parallel processing behavior desired when the HLS application is realized in hardware.

As an illustrative and non-limiting example, hardware-specific features such as HLS directives may be included within the library itself thereby relieving the developer from including any HLS directives within the HLS application created, or actually written, by the developer. By simply relying on the library in creating the HLS application, a circuit design is generated that may be operated on by a hardware compiler to realize a parallel processing circuit architecture to implement the SIMD functionality in hardware. The user need not include, or even be aware of, these HLS directives.

Figure 1:
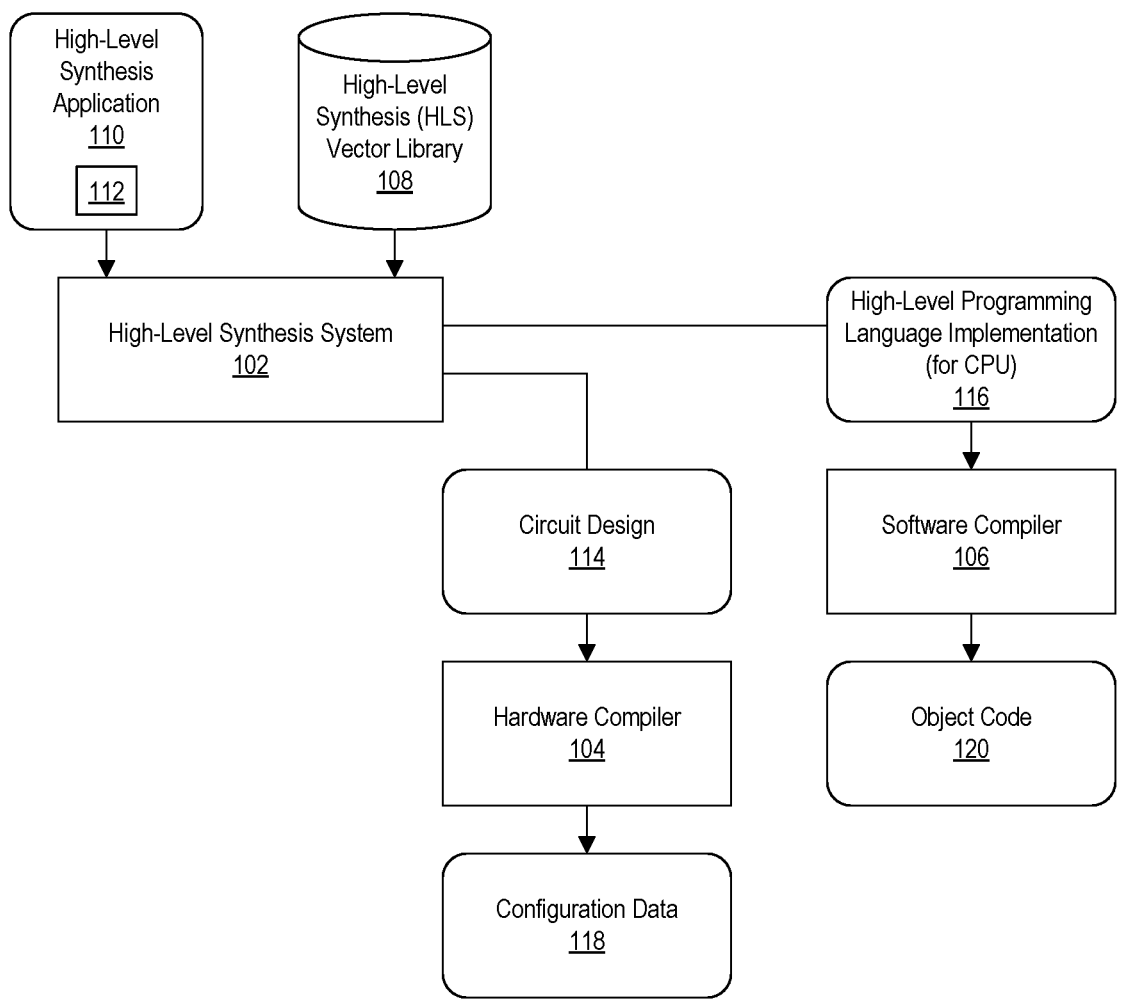
FIG. 1 illustrates an example computing system configured for High-Level Synthesis (HLS) of applications involving vector operations.

FIG. 1 illustrates an example computing system 100. An example architecture for computing system 100 is described herein in connection with FIG. 8. In the example of FIG. 1, computing system 100 includes an HLS system 102, optionally a hardware compiler 104, and optionally a software compiler 106. HLS system 102, hardware compiler 104, and software compiler 106 may be implemented as software executed by computing system 100.

Computing system 100 further includes an HLS vector library 108. An example implementation of HLS vector library 108 is illustrated in Example 7 within this disclosure. HLS vector library 108 facilitates the development of HLS applications where operations on multiple data are to be computed in one clock cycle to fully utilize the available memory bandwidth of the target IC in which the HLS application is to be implemented. An example architecture for a target IC is described in connection with FIG. 9. As defined herein, the term "HLS application," refers to an application specified in a high-level programming language (HLPL) that is intended to be implemented or realized in hardware. In the example of FIG. 1, HLS system 102 may receive an HLS application 110. HLS application 110 may be specified as one or more source code files where the source code is specified in the HLPL. Examples of HLPLs include, but are not limited to, C and C++. HLS application 110 includes a reference 112 to HLS vector library 108. HLS vector library 108 may also be specified in an HLPL such as C or C++.

A "high-level programming language" or "HLPL" means a programming language, or set of instructions, used to program a data processing system (e.g., computer system 100) where the instructions have a strong abstraction from the details of the data processing system, e.g., machine language. For example, a high-level programming language may automate or hide aspects of operation of the data processing system such as memory management. The amount of abstraction typically defines how "high-level" the programming language is. Using a high-level programming language frees the user from dealing with registers, memory addresses, and other low-level features of the data processing system upon which the high-level programming language will execute. In this regard, a high-level programming language includes little or no instructions that translate directly, on a one-to-one basis, into a native opcode of a processor, e.g., a central processing unit (CPU), of a data processing system. Examples of high-level programming languages include, but are not limited to, C, C++, or the like.

HLS vector library 108 is formed of synthesizable program code. The term "synthesizable program code," as defined within this disclosure, means source code specified in an HLPL that may be translated directly into a circuit design specified using a hardware description language (HDL). The particular software constructs of the HLPL used to specify the synthesizable program code, for example, translate into one or more corresponding software constructs of the HDL into which the synthesizable program code is translated.

A hardware description language (HDL) is a computer-language that facilitates the documentation, design, and manufacturing of a digital system, such as an IC. An HDL combines program verification techniques with expert system design methodologies. Using an HDL, for example, a user can design and specify an electronic circuit, describe the operation of the electronic circuit, and create tests to verify operation of the electronic circuit. In general, an HDL includes standard, text-based expressions of the spatial and temporal structure and behavior of the electronic system being modeled. HDL syntax and semantics include explicit notations for expressing concurrency. In contrast to most software programming languages (e.g., HLPLs), an HDL also includes an explicit notion of time, which is a primary attribute of a digital system. HDLs allow a designer to create a definition of a circuit design at the gate level, the register transfer level (RTL), or the behavioral level using abstract data types.

HLS vector library 108 provides one or more vector processing functions that, when translated into a circuit design, implement data parallelism. The one or more vector operations of HLS vector library 108, for example, when translated into a circuit design as part of an HLS application, specify a circuit architecture that is capable of operating on multiple data items, e.g., elements of vector(s), concurrently. As such, any circuit design generated by HLS system 102 from HLS application 110 and/or HLS vector library 108 may be RTL simulated.

Functions implemented in HLS vector library 108 may include one or more HLS directives. As defined herein, the term "HLS directive" refers to an instruction that is included in an HLPL function that instructs HLS system 102 how to translate the HLPL source code of the function into corresponding software constructs of HDL used to define the circuit design. An HLS directive, for example, causes the HLPL source code to be translated, by HLS system 102, in a way that directly influences some characteristic of the resulting circuit architecture specified by circuit design 114 generated by HLS system 102. While HLS directives are considered hardware-related, HLS directives are interpretable and/or usable by HLS system 102 and not by hardware compiler 104. For example, HLS directives, once consumed by HLS system 102, are not included in circuit design 114.

Other hardware-related directives that are usable or interpretable by hardware compiler 104 are referred to as "hardware-compiler directives" may be inserted in circuit design 114 by HLS system 102 as part of the translating performed. As defined herein, the term "hardware-compiler directive" means is an instruction or rule that is interpreted by hardware compiler 104 that controls some characteristic of the physical implementation of circuit design 114 within a target IC as realized by performing one or more aspects of a design flow on circuit design 114.

In another aspect, HLS vector library 108 is compatible with software compilers. Thus, source code that may be generated by HLS system 102 from HLS application 110 and/or HLS vector library 108 may be compiled into executable program code that may be executed by a CPU. As such, HLS application 108 may be simulated by way of hardware (e.g., RTL) simulation and/or software simulation (e.g., as executable program code executed by a CPU). For example, a user may set or specify a switch that indicates whether to generate circuit design 114, HLPL 116, or both.

In an example implementation, HLS vector library 108 is implemented as a header only library. A user may incorporate HLS vector library into HLS application 110 by virtue of reference 112. Reference 112, for example, is a software construct included in HLS application 110. In one example, the software construct implementing reference 112 is an "include" pre-processor directive that causes a pre-processor of HLS system 102 to incorporate the contents of HLS vector library 108 within HLS application 110. In an example where HLS vector library 108 is called "vector.h," reference 112 may be a pre-processor directive such as: #include "hls vector.h".

As defined herein, the term "software construct" means a portion or entirety of one or more instructions of a computer programming language (e.g., HLPL, HDL, or other language that is executable by a computer). A software construct complies with the syntax of the particular computer programming language in which the software construct is included.

HLS application 110 need only include reference 112 and corresponding function calls to any functions of HLS vector library 108 relied on therein. HLS system 102 is capable of translating HLS application 110 into circuit design 114 and/or an HLPL implementation 116. Circuit design 114 may be specified in an HDL as described herein such as VHDL or Verilog. In one example, circuit design 114 is specified as an RTL description. HLS system 102, in generating circuit design 114, generates the HDL of circuit design 114 in accordance with any HLS directives contained HLS vector library 108. In one aspect, as part of generating circuit design 114, HLS system 102 may insert particular hardware-related directives such as hardware-compiler directives in circuit design 114. Since HLS directives are included in HLS vector library 108, the portions of HLS application 110 created by the user or contributed by the user need not include any HLS directives. That is, in one aspect, the only HLS directives that may be included in HLS application 110 are those that are inserted by virtue of including and/or referencing HLS vector library 108. An example of an HLS directive is a "pragma" statement in the example source code included in this disclosure.

In generating HLPL implementation 116, HLS system 102 is capable of removing any HLS directives from the HLPL source code, whether user-specified or contributed source code of HLS application 110 and/or from HLS vector library 108 thereby ensuring compatibility of HLPL implementation 116 with software compiler 106 and/or any processors on which executable code created from HLPL implementation 116 may be executed. Thus, HLPL implementation 116 is free of HLS directives.

In one or more example implementations, HLS vector library 108 and/or HLS application 110 may include one or more hardware-compiler directives that may be passed on and included in the circuit design 114 by HLS system 102. Such hardware-compiler directives may be removed by HLS system 102 in generating HLPL implementation 116.

In the example of FIG. 1, circuit design 114 may be provided to hardware compiler 104. Hardware compiler 104 is capable of performing one or more stages of a design flow on circuit design 114 to generate configuration data 118. For example, compiler 104 is capable of performing stages of a design flow including, but not limited to, synthesis, placement, and routing. In general, synthesis refers to the process of generating a gate-level netlist from circuit design 114. The netlist may be technology specific in that the netlist is intended for implementation in a particular IC referred to as a "target IC." Placement refers to the process of assigning elements of the synthesized circuit design to particular instances of circuit blocks and/or resources having specific locations on the target IC. Routing refers to the process of selecting or implementing particular routing resources, e.g., wires and/or other interconnect circuitry, to electrically couple the various circuit blocks of the target IC after placement. Hardware compiler 104 further may generate configuration data 118 from the synthesized, placed, and routed version of circuit design 114.

Configuration data 118, generated via the design flow performed by hardware compiler 104, may be loaded into the target IC thereby physically implementing HLS application 110 and/or circuit design 114 therein. For example, configuration data 118 may be a configuration bitstream that may be loaded into an IC having programmable circuitry (e.g., programmable logic) that configures the programmable circuitry to implement the resulting circuit design.

In the example of FIG. 1, HLPL implementation 116 may be provided to software compiler 106. Software compiler 106 is capable of compiling HLPL implementation 116 thereby generating object code 120. Object code 120 is executable by a processor. For example, object code 120 may be executed by a processor having an x86 type of architecture, an ARM processor, or any of a variety of other types of processor of varying architectures and/or instruction sets.

The ability to compile HLS application 110 (including HLS vector library 108) using either hardware compiler 104 or software compiler 106 facilitates cross-platform compatibility for purposes of validation. In the case of software compilation, HLS vector library 108 is not guaranteed to provide vector operations that execute in one clock cycle. In many cases, however, due to the way in which HLS vector library 108 is constructed, software compilers are capable of recognizing the SIMD intent and realizing SIMD operation. Still, SIMD operation with respect to object code 120 is not guaranteed, whereas SIMD operation for circuit design 114 and/or configuration data 118 when loaded into a target IC is guaranteed.

In one aspect, HLS vector library 108 provides an HLS vector type via a templatized class "hls::vector<T, N>." HLS vector library 108 is capable of representing a SIMD vector of "N" elements where each element has a type (e.g., a data type) of "T." In the example implementations described herein, the data type T is one that provides common arithmetic operations. Thus, the data type specified by the variable "T" may be any data type upon which arithmetic operations may be performed. Such data types include primitive data types and data types that are available by virtue of a library. Example data types that may be used include, but are not limited to, integer, character, wide character, Boolean, Floating Point, Double Floating Point, and complex. Such data types may be considered fundamental in the particular HLPL that is used. Other data types including compound data types may also be included. One type of compound data type may be complex numbers. Complex numbers may be included by virtue of including, by way of a compiler directive, a complex standard library available in an HLPL. The value of N may be any positive integer. As such, HLS vector library 108 is capable of operating with generic data types where the functionality of HLS vector library 108 may be adapted to more than one type or class.

The structure of HLS vector library 108 allows functions contained therein to operate on a vector of a vector. Further, the ability to handle complex numbers allows HLS vector library 108 to be used in HLS applications configured to implement Fourier transforms and/or analysis in circuitry. By comparison, other available libraries, including those for OpenCL, are unable to process a vector of a vector as described herein and/or handle particular data types such as complex numbers. Processors such as CPUs, for example, lack the native SIMD instructions for handling complex numbers. HLS vector library 108, because of relying on other available data type libraries in the HLPL in which HLS vector library 108 is implemented, expands the data types for vector elements that may be processed. Further, these libraries are capable of limiting the operations that may be performed. As an example, attempting to compare two complex numbers may generate an error as such operations are not permitted in the underlying complex number library.

HLS vector library 108 supports various hardware implementation features that are unavailable in other libraries intended for use and/or execution using only processors. For example, HLS vector library 108 supports vectors of an arbitrary number of elements "N." Further, the elements of the vectors may be any generic data type. Thus, the user may simply specify the data type of vector elements using the variable "T" within the user specified portion of HLS application 110. The user may also specify the number of elements of vectors using the variable "N" where "N" may be assigned any positive integer value. Thus, the number of elements of vectors and the data type of the elements may be defined by the user on a per application basis as opposed to being limited to a particular number of elements of vector and/or vector size supported by the architectural limitations of the target CPU and/or being limited to particular data types. Thus, the number of elements in the vectors of HLS vector library 108 is variable and not fixed as is the case with SIMD libraries supporting only CPU execution.

The value of N may be specified as a power of 2 or not (e.g., a "non-power of 2"). With respect to memory addressing and memory usage, greater efficiency in the resulting circuit architecture may be achieved using values of N that are powers of two. Still, since the resulting circuit architecture is implemented in programmable circuitry, any positive integer value assigned to "N" that fits within the available hardware of the target IC (e.g., is synthesizable) may be implemented. Data alignment may be determined automatically based on the value of "N" that is selected and the size of the data type of elements of the vectors.

For purposes of illustration, consider the source code of Example 1. The source code of Example 1 utilizes HLS vector library 108.

Example 1 hls::vector<int, 4> x={0, 1, 2, 3};
hls::vector<int, 4> y={4, 5, 6, 7};
hls::vector<int, 4> z;
z=x+y In Example 1, if compiled and executed by a CPU, the vector z would be populated with {4, 6, 8, 10} in a single clock cycle. When implemented in hardware, the source code of Example 1 results in a parallel circuit architecture implemented in a target IC that also calculates the vector z in a single clock cycle. As illustrated in the example of FIG. 1, a user may use software compiler 106 (e.g., a C++ compiler) to test the functionality of the above code by writing a "main" code. HLS system 102 may also generate circuit design 114. The functionality of circuit design 114 may be simulated and verified, for example, via RTL simulation, using the same "main" code. The HDL may then be processed through a design flow for implementation in a target IC, e.g., in the programmable circuitry thereof.

Figures 2, 3:
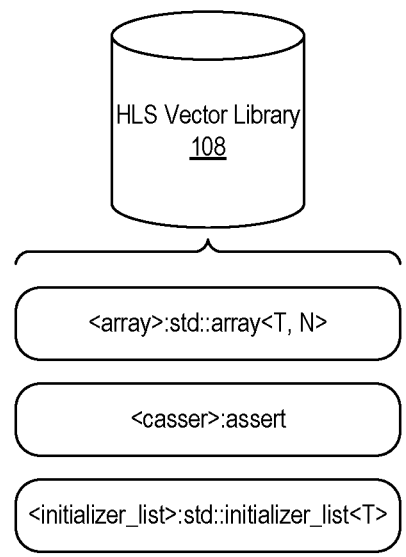
FIG. 2 illustrates an example implementation of an HLS vector library showing dependencies with other libraries.
FIG. 3 illustrates different example memory layouts corresponding to different vector alignments.

FIG. 2 illustrates an example implementation of HLS vector library 108 showing dependencies with other header libraries. In the example of FIG. 2, HLS vector library 108 utilizes one or more other standard header libraries including the "array" library which provides a container that encapsulates fixed size arrays, the "cassert" error handling library, and "initializer_list" that provides access to an array of objects. Within HLS vector library 108, for example, the foregoing header libraries may be included. In cases where HLS vector library 108 is to operate on particular data types, e.g., complex numbers, such libraries may be included in HLS application 110. For example, HLS application 110 would include the statement "#include <complex>" therein.

FIG. 3 illustrates different example memory layouts corresponding to different vector alignments. FIG. 3 illustrates two example alignments of vectors in memory as implemented in hardware. The example of FIG. 3 illustrates how, for a given vector, the memory allocated when implemented in hardware is guaranteed to be contiguous. For purposes of illustration, two alignments labeled Alignment 1 and Alignment 2 are illustrated in FIG. 3. HLS vector library 108 is capable of implementing alignments consistent with Alignment 1.

In the example, the amount of contiguous memory allocated in the target IC may be determined according to the size of the data type "T" times the number of elements "N" of the vectors. For example, the size of the memory allocated for a given vector may be "sizeof(T)*N." Appreciably, elements of vectors are spaced according to the size of "T." Vectors may be aligned in memory by HLS vector library 108 based on the largest, or greatest, power of 2 that divides into N (with a 0 remainder).

The example of FIG. 3 illustrates a case where the vectors include 6 elements (e.g., N=6). Alignment 1 aligns vectors using the power of 2 set equal to 2. Of the powers of 2 including 1, 2, and 4, 2 is the largest that divides into 6 with no remainder (a remainder of 0). As shown in the example of FIG. 3, the vectors V1 and V2 may be stored using Alignment 1 with no wasted memory. Addressing implemented in hardware to access elements of the vectors may be set on a per row basis. Alignment 2 illustrates an example where the power of 2 is set equal to 4. Using a value of 4 leaves a remainder of 2. For consecutively stored vectors V1 and V2 stored in memory, there are two corresponding memory locations that go unused and, as such, wasted. There is a gap (e.g., padding) between the consecutively stored vectors.

The example described herein in connection with FIG. 3 also works in cases where N is an odd value. For example, with N=5, the alignment used by HLS vector library 108 would be based on 1 (e.g., 2°) since using an alignment based on 2 or 4 each have remainders and result in unused portions of memory. For example, with N=5 using an alignment of 1, there are no unused memory location separating consecutively stored vectors. Using an alignment of 2 with N=5 results in one unused memory location, while using an alignment of 4 with N=5 results in three unused memory locations (e.g., a larger amount of padding for purposes of vector alignment). In this regard, HLS vector library 108 provides increased flexibility and capabilities as CPUs using SIMD libraries intended for CPU execution are unable to handle vectors having a number of elements equal to a non-power of 2 (e.g., where the value of N is not a power of 2).

Accordingly, circuit design 114 allocates a contiguous portion of memory for storing the one or more vectors with an alignment automatically determined to be a largest power of two that divides into a size of the one or more vectors, wherein the size of the vector is measured in bytes. The size of the one or more vectors (e.g., where each vector is of the same size) is specified in bytes by multiplying the number of elements in the vector types the size of the data type of the elements.

In accordance with the inventive arrangements, HLS vector library 108 also supports performing operations on a vector of a vector, e.g., a vector that includes vectors as elements. HLS vector library 108 allows a vector of a vector to be used as a matrix. HLS vector library 108 provides a flexible approach to SIMD programming for HLS that allows the user to choose the size vector, in terms of number of elements, to be processed. For circuit implementations that require high data throughput, higher values of "N" may be specified. For example, a value of 16 may be assigned to "N" to achieve higher data throughput. For circuit implementations that require less data throughput, lower values of "N" may be specified. For example, a value of 2 may be assigned to "N."

In cases where HLS vector library 108 is not utilized in creating an HLS application, a change to the size of the vectors, in terms of number of elements, within the user's HLS application would have significant implications requiring the user to make significant changes throughout the source code of the HLS application. Similarly, a change to the data type of elements of the vectors would have significant implications requiring the user to make significant changes throughout the source code of the HLS application. By utilizing HLS vector library 108, a user can change the size of the vectors within HLS application 110 by simply changing the value assigned to "N" and/or change the data type of elements of vectors by simply changing the data type assigned to "T."

Alignment as described in connection with the example of FIG. 3 may be performed using the source code illustrated in Example 2 below.

Example 2 constexpr size_t gp2(size_t N) {return (N>0&& N %2==0)?2*gp2(N/2):1;}
template<typename T, size_t N>
class alignas (gp2(sizeof(T)*N)) vector {
    std::array<T, N> data;
};

FIG. 4 is a table 400 illustrating example vector operations supported by HLS vector library 108. In general, the vector operations supported by HLS vector library 108 include standard C++ operators. Each of the functions illustrated in table 400 is capable of operating on vectors in a recursive manner (e.g., element by element) using the particular operations matching or corresponding to the data type "T." The operations include binary operators, unary operators, and reduction operators. The operators are shown along with in place versions thereof. The example operations described in table 400 also are capable of operating on scalars due to the recursive scalar implementation of the respective vector functions.

In one aspect, HLS vector library 108 further supports a reduction operation where, for a given vector, the elements of that vector may be summed to generate a resulting value (e.g., sum) referred to as a reduction.

FIG. 5 is a table 500 illustrating further example vector operations supported by HLS vector library 108. Table 500 illustrates example lexical operators for vector processing. Each of the lexical operators of table 500 returns a Boolean value. Like the example operations of table 400, the lexical operators of table 500 are capable of operating on scalars.

For example, the "equal" operation compares each element of two specified vectors to determine whether the vectors are equal and returns a true or false value. If at least one element between the two vectors being compared differs, the "equal" operation returns a false value. In one aspect, the operations of FIG. 5 apply a lexigraphic order that operates from left to right. The example operators of table 500, for example, may compare the first element (from left to right, e.g., the leftmost element) of the first vector to the first element of the second vector; the second element (from left to right) of the first vector with the second element of the second vector, etc.

In accordance with the inventive arrangements described within this disclosure, HLS vector library 108 is usable in a software centric way. The term "software centric" refers to the user-specified portion of HLS application 110 (e.g., the portions of source code written or contributed by the user as distinguished from HLS vector library 108 itself) may include no hardware-specific directives. HLS vector library 108 provides a concise and intuitive way of using an HLPL to target hardware such as programmable circuitry. By using HLS vector library 108, no data type conversions in the user's source code are needed since the data types supported are compatible across processors and the target IC. HLS vector library 108 further supports containers and provides alignment that is determined based on the number of elements and data type. Vectors having a number of elements set to a non-power of 2 are also supported with efficient padding.

HLS vector library 108 supports various other operations including initialization. As an illustrative and non-limiting example, the source code of Example 3 shows different examples of vector initialization.

Example 3

```
hls::vector<int, 4> x; //uninitialized
hls::vector<int, 4> y=10; //scalar initialized
hls::vector<int, 4> z={0, 1, 2, 3}; //initializer list (must
    have 4 elements)
```

In the first line, the vector "x," which includes 4 elements, is uninitialized. In the second line, each of the 4 elements of vector "y" is initialized to the value of "10." In the third line, the vector "z" is initialized as shown where the first element is set to 0, the second element to 1, the third element to 2, and the fourth element to 3.

HLS vector library 108 further supports accessing individual elements of a vector using the operator [ ]. The operator [ ] mimics the operation of a standard array. The source code shown in Example 4 illustrates accessing individual elements of a vector.

Example 4

```
x[i]= . . . ; //reference to an element
. . . =x[i]; //value of an element
```

The resulting circuit architecture that is implemented within the target IC to effectuate access to individual elements of a vector stored in memory may be implemented therein by creating multiplexer circuitry using the programmable circuitry of the target IC.

In one or more example implementations, HLS vector library 108 supports other libraries (e.g., C++ libraries) including, but not limited to:

<algorithm>: std::min and std::max
<cmath>: all the math functions
<functional>: std::hash
<utility>: std::swap"std::min, std::max, std::swap, std::hash Example 5 below illustrates source code for implementing vector operations in an electronic system without using HLS vector library 108. The source code of Example 5 includes various HLS directives in the form of pragmas that instruct HSL system 102 to implement parallel operations to effectuate vector operations in the resulting circuit design that is generated. In the example of FIG. 5, the user-provided source code includes the pragmas. That is, the user must have an understanding of the target IC and hardware implementation tools to include the necessary HLS directives (e.g., #pragma statements) with correct parameters in the appropriate locations of the source code to effectuate the parallel processing desired in the resulting hardware implementation.

Example 5

```
constexpr size_t V = sizeof(ap_int<512>) / sizeof(float);
constexpr size_t SIZE = 1024 / V;
constexpr size_t BLOCK = 8;
// Need to use a "conversion" union
union convert {
```

-continued

Example 5

```
    ap_int<512> i;
    float f[V];
}
// Need to use ap_int<512> to get right bus width
void kernel(ap_int<512> *res, const ap_int<512> *lhs,
        const ap_int<512> *rhs, int n)
{
    ...
    #pragma HLS INTERFACE ... for depth
    // Need to use reshape/partition to widen local arrays
        float lhs_buf[BLOCK * V];
    #pragma HLS ARRAY_RESHAPE variable=lhs_buf factor=V
        for (int i = 0; i < BLOCK; ++i) {
    #pragma HLS PIPELINE
    // Need to access using the "ap_int<512>" ... and then convert to "float"
            convert lhs_conv;
            lhs_conv.i = lhs[i+BLOCK*o];
            for (int v = 0; v < V; ++v) {
    // Need to unroll "vector" loop
    #pragma HLS UNROLL
                lhs_buff[i+v] = lhs_conv.f[v];
            }
        }
    ...
    ...
        for (int i = 0; i < BLOCK * V; ++i) {
    #pragma HLS PIPELINE
    #pragma HLS UNROLL factor=V
    // Even using factor=V the code is still ugly
            convert rhs_conv;
            convert res_conv;
            if(i % V == 0)
                rhs_conv.i = rhs[i+BLOCK*o];
            res_conv.f[i % V] = lhs_buff[i] + rhs_conv.f[i % V];
            if (i % V == V-1)
                res[i+o*BLOCK] =res_conv.i;
        }
    ...
}
int main(int, char**) {
    // Can't use standard containers as we need custom alignment
    float *lhs = (float*) aligned_alloc(alignof(ap_int<512>), SIZE);
    float *rhs = (float*) aligned_alloc(alignof(ap_int<512>), SIZE);
    float *res = (float*) aligned_alloc(alignof(ap_int<512>), SIZE);
    ...
    // Need to cast to ap_int<512>* (that's why we need the custom
alignment)
    kernel((ap_int<512>*) res, (ap_int<512>*) lhs, (ap_int<512>*) rhs);
    free(lhs);
    free(rhs);
    free(res);
    ...
}
```

Example 6 below illustrates source code for implementing vector operations in an electronic system that uses HLS vector library 108. The source code of Example 6, which illustrates user-specified or user-contributed source code, does not include any HLS directives. The HLS directives are incorporated into HLS vector library 108. Further, the amount of source code needed to specify the electronic system is reduced in comparison to that of Example 5.

Example 6 include "hls_vector.h"

using vfloat=hls::vector<float, 16>;

constexpr size_t SIZE=1024/vfloat.size( )

constexpr size_t BLOCK=8;

```
void kernel(vfloat*res, const vfloat*lhs, const vfloat
    rhs, int n) {
    ...
    vfloat lhs_buf[BLOCK];
    for (int i=0; i<BLOCK; ++i) {
        lhs_buf[i]=lhs[i+BLOCK*o];
    }
    for (int i=0; i<BLOCK; ++i) {
        res[i+BLOCK*o]=lhs_buf[i]+rhs[i+BLOCK*o];
    }
    ...
}
int main(int, char**) {
    std::vector<vfloat> lhs(SIZE);
    std::vector<vfloat> rhs(SIZE);
    std::vector<vfloat> res(SIZE);
    ...
    kernel(res.data( ), lhs.data( ), rhs.data( ), SIZE);
    ...
    return 0;
}
```

FIG. 6 illustrates an example method 600 showing certain operative features of a computing system configured to implement an HLS application that uses vector operations. In block 602, an HLS vector library 108 is provided as a data structure. For example, HSL vector library 108 may be stored in a storage device, e.g., a memory, that is within or communicatively linked to computer system 100. HLS vector library 108 may be specified in an HLPL and include a function configured to perform a vector operation using one or more vectors.

In block 604, a first software construct is included in HLS vector library 108. The first software construct defines a number of elements included in the one or more vectors. As an example, the first software construct may be "size_t N" of the vector constructor "template <typename T, size_t N>." The number of elements included in the vector(s) is variable. That is, a user may specify the number of elements included in the vector(s).

In one aspect, the number of elements included in the one or more vectors is a power of 2. In another aspect, the number of elements of the one or more vectors processed by the function is a number other than a power of two.

In block 606, the number of elements included in the one or more vectors processed by the function is determined, using computing system 100, from a first variable included in HLS application 110. HLS application uses HLS vector library 108 to perform the function. The first variable specifies an arbitrary positive integer value.

In block 608, computer system 100 is capable of generating circuit design 114 from HLS application 110. Circuit design 114 is configured to implement the function in hardware to perform the vector operation in one clock cycle.

The foregoing and other implementations can each optionally include one or more of the following features, alone or in combination. Some example implementations include all the following features in combination.

In another aspect, a data type of each element of the one or more vectors processed by the function is specified as second software construct within HLS vector library 108 and is determined from a second variable of HLS application 110. As an example, the second software construct may be "typename T" of the vector constructor "template <typename T, size_t N>." In the example, the vector constructor takes two arguments wherein the first is data type and second argument is size.

In another aspect, a data type of each element of the one or more vectors processed by the function is complex.

In another aspect, HLS vector library 108 is configured for compilation into executable program code for execution on a processor such as a CPU.

In another aspect, the data structure of HLS vector library 108 includes a header file.

In another aspect, user-contributed source code of HLS application 110 is free of an HLS directive. That is, the portions of source code of HLS application 110 other than HLS vector library 108 do not include any HLS directives.

In another aspect, circuit design 114 allocates a contiguous portion of memory for storing the one or more vectors with an alignment automatically determined to be a largest power of two that divides into a size of the one or more vectors, wherein the size is in bytes. The size of the one or more vectors (e.g., where each vector is of the same size) is specified in bytes by multiplying the number of elements in the vector types the size of the data type of the elements.

In another aspect, computer system 100 implements circuit design 114 in programmable circuitry of a target IC.

Figure 7:
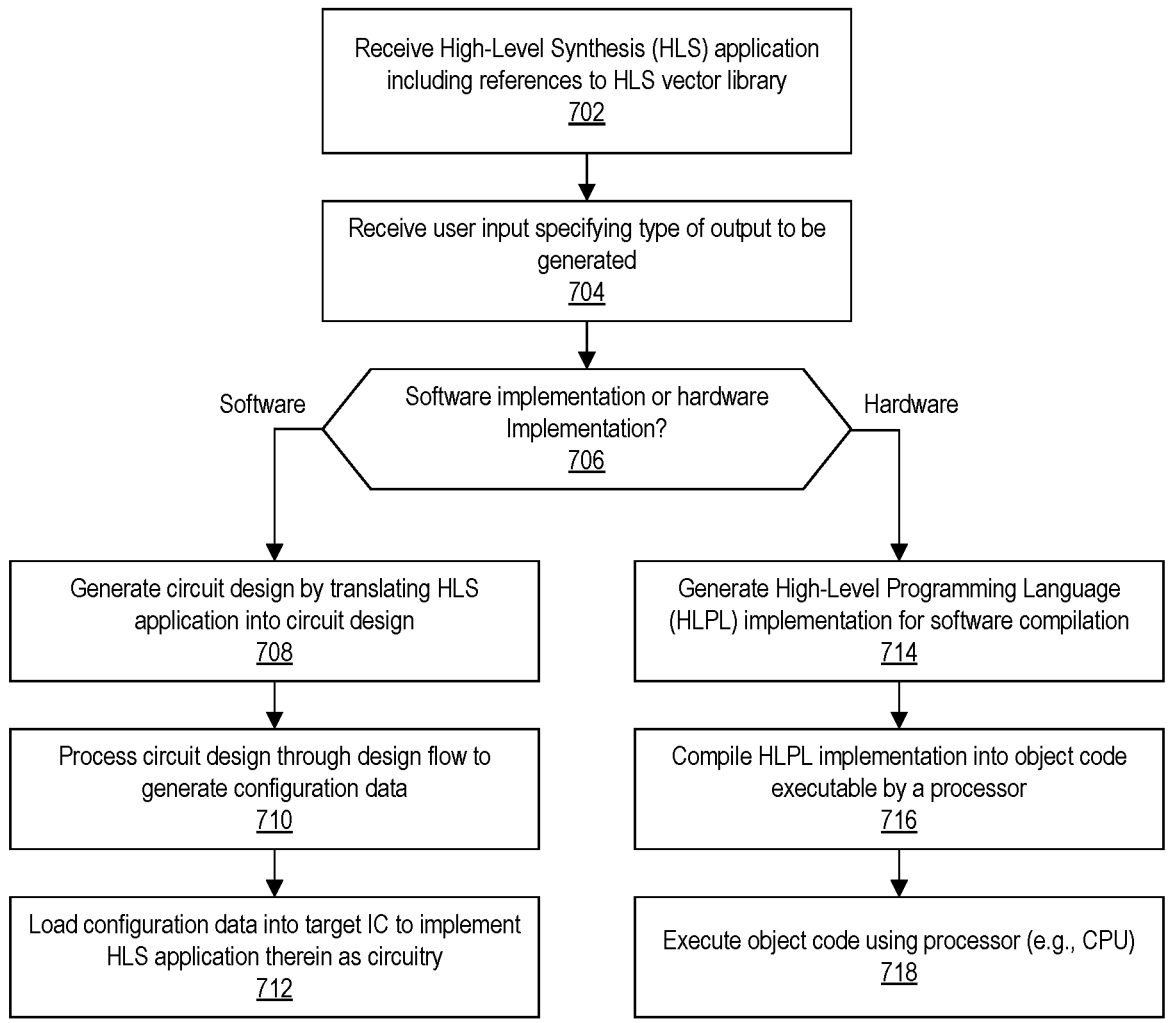
FIG. 7 illustrates another example method showing certain operative features of the computing system of FIG. 1.

FIG. 7 illustrates another example method 700 showing certain operative features of a computing system configured to implement an HLS application that uses vector operations. In block 702, computing system 100 receives HLS application 110. HLS application 110 includes a reference to HLS vector library 108. For example, HLS application 110 includes HLS vector library 108 through an include statement included therein. Further, HLS application 110 invokes or calls one or more functions of HLS vector library 108.

In block 704, computer system 100 receives a user input indicating a type of output to be generated. The user input be provided as a switch as part of a command line instruction or other parameter to HLS application 102. The user input may specify whether hardware or software is to be generated.

In block 706, computer system 100, in executing HLS system 102, determines whether a software implementation or a hardware implementation was specified by the received user input. In response to determining that a hardware implementation is requested, method 700 continues to block 708. In response to determining that a software implementation is requested, method 700 continues to block 714.

In block 708, computer system 100, in executing HLS system 102, generates circuit design 114 by translating HLS application 110 into HDL (e.g., circuit design 114). In one aspect, with respect to the user-specified or contributed portions, HLS application 110 includes no HLS directives. In another aspect, HLS application 110 includes no hardware-specific directives in the user-specified or contributed portions. That is, the user-specified or contributed portions of HLPL of HLS application 110 include neither HLS directives nor hardware-compiler directives.

In blocks 710 and 712, computer system 100 implements circuit design 114 in a target IC. For example, in block 710, computer system 100, in executing hardware compiler 104, processes circuit design 114 through a design flow to generate configuration data. In block 712, computer system 100 is capable of loading the configuration data into the target IC to implement HLS application 110 therein as circuitry.

In block 714, in the case where the user input indicated a software implementation, computer system 100, in executing HLS system 102, generates HLPL implementation 116 (e.g., source code). HLPL 116 may be devoid of, e.g., not include, any hardware-specific directives (neither HLS directives nor hardware-compiler directives). In block 716, computer system 100, in executing software compiler 106, compiles HLPL implementation 116 into object code 120. As part of block 716, computer system 100 is capable of performing any necessary linking operations. In block 718, computer system 100, e.g., the processor or CPU therein, is capable of executing object code 120.

Figure 8:
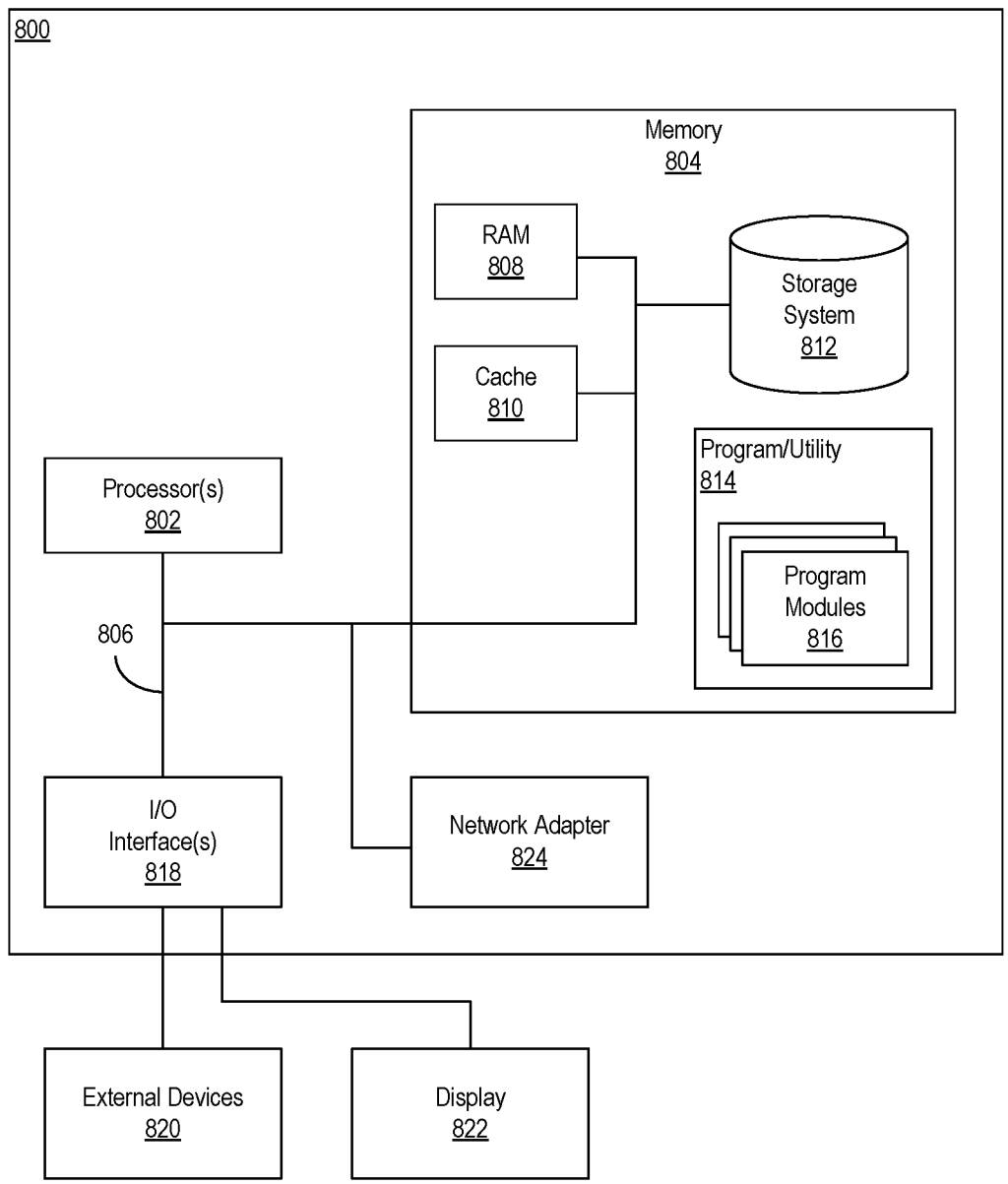
FIG. 8 illustrates an example architecture for the computing system of FIG. 1.

FIG. 8 illustrates an example architecture for computing system 100. Architecture 800 is only one example implementation that may be used to implement computing system 100. Architecture 800 may be used in a standalone capacity, e.g., as a user computing device or a server, as part of a computing cluster (e.g., two or more interconnected computers), or as a cloud computing node. The example of FIG. 8 is not intended to suggest any limitation as to the scope of use or functionality of example implementations described herein. Architecture 800 may be used to implement a computer and/or computer hardware that is capable of performing the various operations described within this disclosure.

Architecture 800 may be operational with numerous other general purpose or special purpose computing system environments or configurations. Examples of computing systems, environments, and/or configurations that may be suitable for use with architecture 800 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Architecture 800 can be described in the general context of computer system-executable instructions, such as program modules, that are executable by a computer system. Generally, program modules can include routines, programs, objects, components, logic, data structures, and so on that perform particular tasks or implement particular abstract data types. Architecture 800 can be practiced as a standalone computer system such as a server or in distributed cloud computing environments where tasks are performed by remote processing devices that are linked through a communications network. In a distributed cloud computing environment, program modules may be located in both local and remote computer system storage media including memory storage devices.

As shown in FIG. 8, the components of architecture 800 can include, but are not limited to, a processor 802, a memory 804, and a bus 806 that couples various system components including memory 804 to processor 802. Processor 802 may be implemented as one or more processors.

Bus 806 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, and PCI Express (PCIe) bus.

Architecture 800 typically includes a variety of computer system readable media. Such media may include computer-readable volatile and non-volatile media and computer readable removable and non-removable media.

Memory 804 can include computer readable media in the form of volatile memory, such as random-access memory (RAM) 808 and/or cache memory 810. Architecture 800 can also include other removable/non-removable, volatile/non-volatile computer storage media. By way of example, storage system 812 can be provided for reading from and writing to a non-removable, non-volatile magnetic and/or solid-state media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 806 by one or more data media interfaces. Memory 804 is an example of at least one computer program product having a set (e.g., at least one) of program modules that are configured to carry out the functions and/or operations described herein.

Program/utility 814, having a set (at least one) of program modules 816, may be stored in memory 804. By way of example, program modules 816 may represent an operating system, one or more application programs, other program modules, and program data. Program modules 816 generally carry out the functions and/or methodologies of the example implementations described within this disclosure. For example, one or more of program modules 816 may implement HLS system 102, hardware compiler 104, software compiler 106, and/or HLS vector library 108.

Program/utility 814 is executable by processor 802. Program/utility 814 and any data items used, generated, and/or operated upon by architecture 800 are functional data structures that impart functionality when employed by architecture 800. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Architecture 800 may also communicate with one or more external devices 820 such as a keyboard, a pointing device, a display 822, etc.; one or more devices that enable a user to interact with architecture 800; and/or any devices (e.g., network card, modem, etc.) that enable architecture 800 to communicate with one or more other computing devices. Such communication can occur via input/output (I/O) interfaces 818. Still, architecture 800 can communicate with one or more networks such as a local area network (LAN), a general wide area network (WAN), and/or a public network (e.g., the Internet) via a network adapter 824. As depicted, network adapter 824 communicates with the other components of architecture 800 via bus 806. It should be understood that although not shown, other hardware and/or software components could be used in conjunction with architecture 800. Examples, include, but are not limited to: microcode, device drivers, redundant processing units, external disk drive arrays, RAID systems, tape drives, and data archival storage systems, etc.

Architecture 800 may include fewer components than shown or additional components not illustrated in FIG. 8 depending upon the particular type of device and/or system that is implemented. The particular operating system and/or application(s) included may vary according to device and/or system type as may the types of I/O devices included. Further, one or more of the illustrative components may be incorporated into, or otherwise form a portion of, another component. For example, a processor may include at least some memory.

Figure 9:
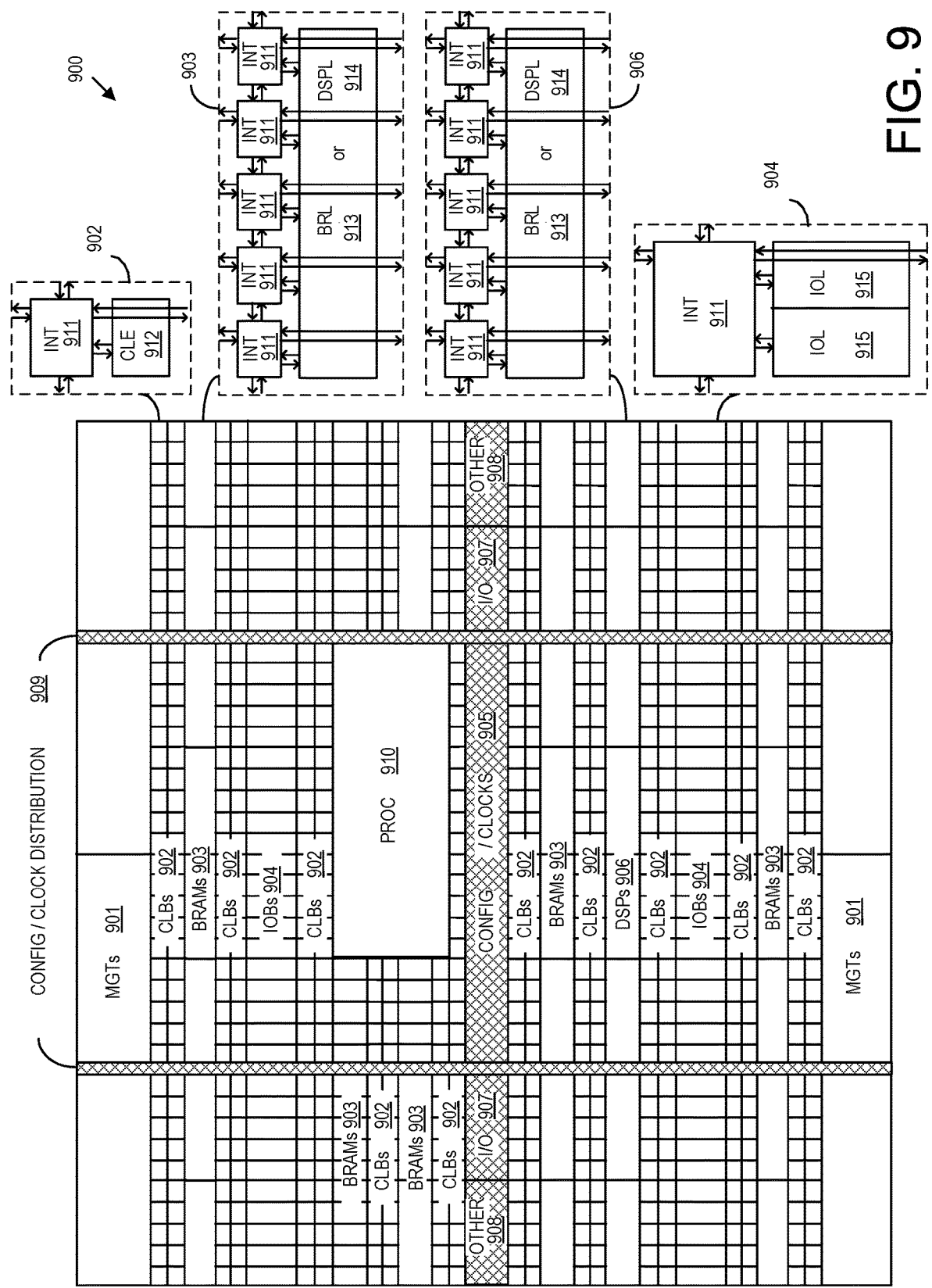
FIG. 9 illustrates an example architecture for an integrated circuit (IC).

FIG. 9 illustrates an example architecture 900 for an IC. In one aspect, architecture 900 may be implemented within a programmable IC. For example, architecture 900 may be used to implement a field programmable gate array (FPGA) type of programmable IC. Architecture 900 may also be representative of a system-on-chip (SoC) type of IC. An SoC is an IC that includes a processor that executes program code and one or more other circuits. The other circuits may be implemented as hardwired circuitry, programmable circuitry, and/or a combination thereof. The circuits may operate cooperatively with one another and/or with the processor.

As shown, architecture 900 includes several different types of programmable circuit, e.g., logic, blocks. For example, architecture 900 may include a large number of different programmable tiles including multi-gigabit transceivers (MGTs) 901, configurable logic blocks (CLBs) 902, random access memory blocks (BRAMs) 903, input/output blocks (IOBs) 904, configuration and clocking logic (CONFIG/CLOCKS) 905, digital signal processing blocks (DSPs) 906, specialized I/O blocks 907 (e.g., configuration ports and clock ports), and other programmable logic 908 such as digital clock managers, analog-to-digital converters, system monitoring logic, and so forth.

In some ICs, each programmable tile includes a programmable interconnect element (INT) 911 having standardized connections to and from a corresponding INT 911 in each adjacent tile. Therefore, INTs 911, taken together, implement the programmable interconnect structure for the illustrated IC. Each INT 911 also includes the connections to and from the programmable logic element within the same tile, as shown by the examples included at the right of FIG. 9.

For example, a CLB 902 may include a configurable logic element (CLE) 912 that may be programmed to implement user logic plus a single INT 911. A BRAM 903 may include a BRAM logic element (BRL) 913 in addition to one or more INTs 911. Typically, the number of INTs 911 included in a tile depends on the height of the tile. As pictured, a BRAM tile has the same height as five CLBs, but other numbers (e.g., four) also may be used. A DSP tile 906 may include a DSP logic element (DSPL) 914 in addition to an appropriate number of INTs 911. An IOB 904 may include, for example, two instances of an I/O logic element (IOL) 915 in addition to one instance of an INT 911. The actual I/O pads connected to IOL 915 may not be confined to the area of IOL 915.

In the example pictured in FIG. 9, a first shaded area near the center of the die, e.g., formed of regions 905, 907, and 908, may be used for configuration, clock, and other control logic. Other shaded areas 909 extending from the first shaded area may be used to distribute the clocks and configuration signals across the breadth of the programmable IC.

Some ICs utilizing the architecture illustrated in FIG. 9 include additional logic blocks that disrupt the regular columnar structure making up a large part of the IC. The additional logic blocks may be programmable blocks and/or dedicated circuitry. For example, a processor block depicted as PROC 910 spans several columns of CLBs and BRAMs.

In one aspect, PROC 910 may be implemented as dedicated circuitry, e.g., as a hardwired processor, that is fabricated as part of the die that implements the programmable circuitry of the IC. PROC 910 may represent any of a variety of different processor types and/or systems ranging in complexity from an individual processor, e.g., a single core capable of executing program code, to an entire processor system having one or more cores, modules, co-processors, interfaces, or the like.

In another aspect, PROC 910 may be omitted from architecture 900 and replaced with one or more of the other varieties of the programmable blocks described. Further, such blocks may be utilized to form a "soft processor" in that the various blocks of programmable circuitry may be used to form a processor that can execute program code as is the case with PROC 910.

The phrase "programmable circuitry" refers to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. A non-limiting example of "programmable circuitry" is "programmable logic." For example, circuit blocks shown in FIG. 9 that are external to PROC 910 such as CLBs 902 and BRAMs 903 are considered programmable circuitry of the IC.

In general, the functionality of programmable circuitry is not established until configuration data is loaded into the IC. A set of configuration bits may be used to program programmable circuitry of an IC such as an FPGA. The configuration bit(s) typically are referred to as configuration data or a "configuration bitstream." In general, programmable circuitry is not operational or functional without first loading a configuration bitstream into the IC. The configuration bitstream effectively implements a particular circuit design within the programmable circuitry. The circuit design specifies, for example, functional aspects of the programmable circuit blocks and physical connectivity among the various programmable circuit blocks.

Circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry is generally considered to have dedicated circuit blocks and interconnects, for example, that are functional without first loading a configuration bitstream into the IC, e.g., PROC 910.

In some instances, hardwired circuitry may have one or more operational modes that can be set or selected according to register settings or values stored in one or more memory elements within the IC. The operational modes may be set, for example, through the loading of a configuration bitstream into the IC. Despite this ability, hardwired circuitry is not considered programmable circuitry as the hardwired circuitry is operable and has a particular function when manufactured as part of the IC.

In the case of an SoC, the configuration bitstream may specify the circuitry that is to be implemented within the programmable circuitry and the program code that is to be executed by PROC 910 or a soft processor. In some cases, architecture 900 includes a dedicated configuration processor that loads the configuration bitstream to the appropriate configuration memory and/or processor memory. The dedicated configuration processor does not execute user-specified program code. In other cases, architecture 900 may utilize PROC 910 to receive the configuration bitstream, load the configuration bitstream into appropriate configuration memory, and/or extract program code for execution.

FIG. 9 is intended to illustrate an example architecture that may be used to implement an IC that includes programmable circuitry, e.g., a programmable fabric. For example, the number of logic blocks in a column, the relative width of the columns, the number and order of columns, the types of logic blocks included in the columns, the relative sizes of the logic blocks, and the interconnect/logic implementations included at the right of FIG. 9 are purely illustrative. In an actual IC, for example, more than one adjacent column of CLBs is typically included wherever the CLBs appear, to facilitate the efficient implementation of a user circuit design. The number of adjacent CLB columns, however, may vary with the overall size of the IC. Further, the size and/or positioning of blocks such as PROC 910 within the IC are for purposes of illustration only and are not intended as limitations.

The example implementations described herein may be used to implement circuitry derived or created from an HLS application in any of a variety of different ICs that include at least some programmable circuitry. Examples of such ICs may include FPGAs, SoCs, Application-Specific ICs, or the like.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity.

As defined herein, the singular forms "a," "an," and "the" are intended to include the plural forms as well, unless the context clearly indicates otherwise.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human intervention. As defined herein, the term "user" means a human being.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. The various forms of memory, as described herein, are examples of computer readable storage media. A non-exhaustive list of more specific examples of a computer readable storage medium may include: a portable computer diskette, a hard disk, a RAM, a read-only memory (ROM), an erasable programmable read-only memory (EPROM or Flash memory), an electronically erasable programmable read-only memory (EEPROM), a static random-access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the term "processor" means at least one circuit capable of carrying out instructions contained in program code. The circuit may be an IC or embedded in an IC. A CPU is an example of a processor.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the inventive arrangements described herein. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object-oriented programming language and/or procedural programming languages. Computer readable program instructions may include state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the inventive arrangements disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

An example implementation of HLS vector library 108 is provided below in Example 7. In Example 7, macros are defined so that (OP) is the operation to be performed. The macros allow swapping of the operators so that each function need not be rewritten for each of the operators specified.

Example 7

```
#ifndef _HLS_VECTOR_H_
#define _HLS_VECTOR_H_
#include <array>
#include <cassert>
#include <initializer_list>
namespace hls {
#ifdef _SYNTHESIS_
#define SYN_PRAGMA(PRAG)_Pragma(#PRAG)
#else
#define SYN_PRAGMA(PRAG)
#endif
#ifndef INLINE
#define INLINE [[gnu::always_inline]]
#endif
namespace details {
/// Returns the greatest power of two that divides N
```

-continued

Example 7

```
constexpr size_t gp2(size_t N) {
   if (N == 0)
      return 0;
   if (N % 2 != 0)
      return 1;
   return 2 * gp2(N / 2);
}
} // namespace details
/// SIMD Vector of 'N' elements of type 'T'
template <typename T, size_t N>
class alignas(details::gp2(sizeof(T) * N)) vector {
   static_assert(N > 0, "vector must have at least one element");
   using data_t = std::array<T, N>;
   data_t data;
protected:
   /// Pragma setter (hack until we support pragma on types)
   /// Note: must be used on all functions if possible
   INLINE void pragma( ) const {
      SYN_PRAGMA(HLS AGGREGATE variable=this)
   }
public:
   /// Default constructor (trivial)
   vector( ) = default;
   /// Copy-constructor (trivial)
   vector(const vector &other) = default;
   /// Move-constructor (trivial)
   vector(vector &&other) = default;
   /// Copy-assignment operator (trivial)
   vector &operator=(const vector &other) = default;
   /// Move-assignment operator (trivial)
   vector &operator=(vector &&other) = default;
   /// Destructor (trivial)
   ~vector( ) = default;
   /// Note: all the above special member functions must be trivial,
   /// as we want this class to be usable in union (POD requirement).
   /// Construct from T (scalar)
   vector(const T &val) {
      pragma( );
      for (T &elem : data) {
         SYN_PRAGMA(HLS UNROLL)
         elem = val;
      }
   }
   /// Construct from std::array<T, N>
   vector(const std::array<T, N> &data) : data{data} {
      pragma( );
   }
   /// Construct from std::initializer_list<T>
   vector(std::initializer_list<T> l) {
      pragma( );
      assert(l.size( ) == N &&
            "Initializer list must be the same size as the vector");
      for (size_t i = 0; i < N; ++i) {
         data[i] = l.begin( )[i];
      }
   }
   /// Array-like operator[ ]
   T &operator[ ](size_t idx) {
      pragma( );
      return data[idx];
   }
   const T &operator[ ](size_t idx) const {
      pragma( );
      return data[idx];
   }
   /// Iterators
   using iterator = typename data_t:iterator;
#define INPLACE_PREUNOP(OP)                              \
   vector &operator OP( ) {                              \
      pragma( );                                         \
      for (size_t i = 0; i < N; ++i) {                   \
         SYN_PRAGMA(HLS UNROLL)                          \
         OP data[i];                                     \
      }                                                  \
      return *this;                                      \
   }
   INPLACE_PREUNOP(++)
```

| Example 7 |
|---|

```
    INPLACE_PREUNOP(--)
#define INPLACE_POSTUNOP(OP)                        \
    vector operator OP(int) {                        \
        pragma( );                                   \
        vector orig = *this;                         \
        OP *this;                                    \
        return orig;                                 \
    }
    INPLACE_POSTUNOP(++)
    INPLACE_POSTUNOP(--)
#define INPLACE_BINOP(OP)
    vector &operator OP(const vector &rhs) {         \
        pragma( );                                   \
        rhs.pragma( );                               \
        for (size_t i = 0; i < N; ++i) {             \
            SYN_PRAGMA(HLS UNROLL)                   \
            data[i] OP rhs[i];                       \
        }                                            \
        return *this;                                \
    }
    INPLACE_BINOP(+=)
    INPLACE_BINOP(-=)
    INPLACE_BINOP(*=)
    INPLACE_BINOP(/=)
    INPLACE_BINOP(%=)
    INPLACE_BINOP(&=)
    INPLACE_BINOP(|=)
    INPLACE_BINOP(^=)
    INPLACE_BINOP(<<=)
    INPLACE_BINOP(>>=)
#define REDUCE_OP(NAME, OP)                          \
    T reduce_##NAME( ) const {                       \
        pragma( );                                   \
        T res = data[0];                             \
        for (size_t i = 1; i < N; ++i) {             \
            SYN_PRAGMA(HLS UNROLL)                   \
            res OP data[i];                          \
        }                                            \
        return res;                                  \
    }
    REDUCE_OP(add, +=)
    REDUCE_OP(mult, *=)
    REDUCE_OP(and, &=)
    REDUCE_OP(or, |=)
    REDUCE_OP(xor, ^=)
#define LEXICO_OP(OP)
    friend bool operator OP(const vector &lhs, const vector &rhs) {   \
        lhs.pragma( );                               \
        rhs.pragma( );                               \
        for (size_t i = 0; i < N; ++i) {             \
            SYN_PRAGMA(HLS UNROLL)                   \
            if (lhs[i] == rhs[i])                    \
                continue;                            \
            return lhs[i] OP rhs[i];                 \
        }                                            \
        return T{ } OP T{ };                         \
    }
#define COMPARE_OP(OP)                               \
    friend vector<bool, N> operator OP(const vector &lhs, const vector &rhs) {   \
        lhs.pragma( );                               \
        rhs.pragma( );                               \
        vector<bool, N> res;                         \
        for (size_t i = 0; i < N; ++i) {             \
            SYN_PRAGMA(HLS UNROLL)                   \
            res[i] = lhs[i] OP rhs[i];               \
        }                                            \
        return res;                                  \
    }
    LEXICO_OP(<)
    LEXICO_OP(<=)
    LEXICO_OP(==)
    LEXICO_OP(!=)
    LEXICO_OP(>=)
    LEXICO_OP(>)
#define BINARY_OP(OP, INPLACE_OP)                    \
    friend vector operator OP(vector lhs, const vector &rhs) {   \
        lhs.pragma( );                               \
```

Example 7

```
        rhs.pragma( );                          \
        return lhs INPLACE_OP rhs;              \
    }
    BINARY_OP(+, +=)
    BINARY_OP(-, -=)
    BINARY_OP(*, *=)
    BINARY_OP(/, /=)
    BINARY_OP(%, %=)
    BINARY_OP(&, &=)
    BINARY_OP(|, |=)
    BINARY_OP(^, ^=)
    BINARY_OP(<<, <<=)
    BINARY_OP(>>, >>=)
};
} // namespace hls
#endif
```

What is claimed is:

1. A method, comprising:
providing a High-Level Synthesis (HLS) vector library as a data structure, wherein the HLS vector library is specified in a high-level programming language and includes a function configured to perform a vector operation using one or more vectors;
including within the HLS vector library, a first software construct that defines a number of elements included in the one or more vectors, wherein the number of elements is variable;
determining, using computer hardware, the number of elements included in the one or more vectors processed by the function from a first variable included in an HLS application that uses the HLS vector library to perform the function, wherein the first variable specifies an arbitrary positive integer value; and
generating a circuit design from the HLS application, wherein the circuit design is configured to implement the function in hardware to perform the vector operation in one clock cycle.

2. The method of claim 1, wherein the number of elements of the one or more vectors processed by the function is a number other than a power of two.

3. The method of claim 1, wherein a data type of each element of the one or more vectors processed by the function is specified as a second software construct within the HLS vector library and is determined from a second variable of the HLS application.

4. The method of claim 1, wherein a data type of each element of the one or more vectors processed by the function is complex.

5. The method of claim 1, wherein the HLS vector library is configured for compilation into object code for execution on a processor.

6. The method of claim 1, wherein the data structure of the HLS vector library includes a header file.

7. The method of claim 1, wherein user-contributed source code of the HLS application is free of any HLS directive.

8. The method of claim 1, wherein the circuit design allocates a contiguous portion of memory for storing the one or more vectors with an alignment automatically determined to be a largest power of two that divides into a size of the one or more vectors, wherein the size is in bytes.

9. The method of claim 1, further comprising:
implementing the circuit design in programmable circuitry of a target integrated circuit.

10. A system, comprising:
a processor configured to initiate operations including:
storing a High-Level Synthesis (HLS) vector library as a data structure, wherein the HLS vector library is specified in a high-level programming language and includes a function configured to perform a vector operation using one or more vectors;
including within the HLS vector library, a first software construct that defines a number of elements included in the one or more vectors, wherein the number of elements is variable;
determining, using computer hardware, the number of elements included in the one or more vectors processed by the function from a first variable included in an HLS application that uses the HLS vector library to perform the function, wherein the first variable specifies an arbitrary positive integer value; and
generating a circuit design from the HLS application, wherein the circuit design is configured to implement the function in hardware to perform the vector operation in one clock cycle.

11. The system of claim 10, wherein the number of elements of the one or more vectors processed by the function is a number other than a power of two.

12. The system of claim 10, wherein a data type of each element of the one or more vectors processed by the function is specified as a second software construct within the HLS vector library and is determined from a second variable of the HLS application.

13. The system of claim 10, wherein a data type of each element of the one or more vectors processed by the function is complex.

14. The system of claim 10, wherein the HLS vector library is configured for compilation into object code for execution on a processor.

15. The system of claim 10, wherein the data structure of the HLS vector library includes a header file.

16. The system of claim 10, wherein user-contributed source code of the HLS application is free of any HLS directive.

17. The system of claim 10, wherein the circuit design allocates a contiguous portion of memory for storing the one or more vectors with an alignment automatically determined to be a largest power of two that divides into a size of the one or more vectors, wherein the size is in bytes.

18. The system of claim 10, wherein the processor is configured to implement executable operations comprising:

implementing the circuit design in programmable circuitry of a target integrated circuit.

19. A computer program product, comprising:

one or more computer readable storage media, and computer readable program instructions collectively stored on the one or more computer readable storage media, wherein the computer readable program instructions include:

a High-Level Synthesis (HLS) vector library;

wherein the HLS vector library is specified in a high-level programming language and includes a function configured to perform a vector operation using one or more vectors;

wherein the function is configured to operate on one or more vectors, wherein each vector includes a number of elements determined from a first variable configured to take on an arbitrary positive integer value;

wherein the arbitrary positive integer value is detected from the first variable as defined in an HLS application; and wherein the function is synthesizable into a circuit design that, when implemented in circuitry, performs the vector operation in one clock cycle.

20. The computer program product of claim 19, wherein a data type of each element of the one or more vectors is specified as a second variable; and the data type is detected from the second variable as defined in the HLS application.

\* \* \* \* \*